Aug. 24, 1954  B. D. BEAMISH  2,687,150
APPARATUS FOR SLICING HONEYCOMB CORES
Filed July 2, 1951  2 Sheets-Sheet 1

INVENTOR
BERNARD D. BEAMISH
BY
ATTORNEYS

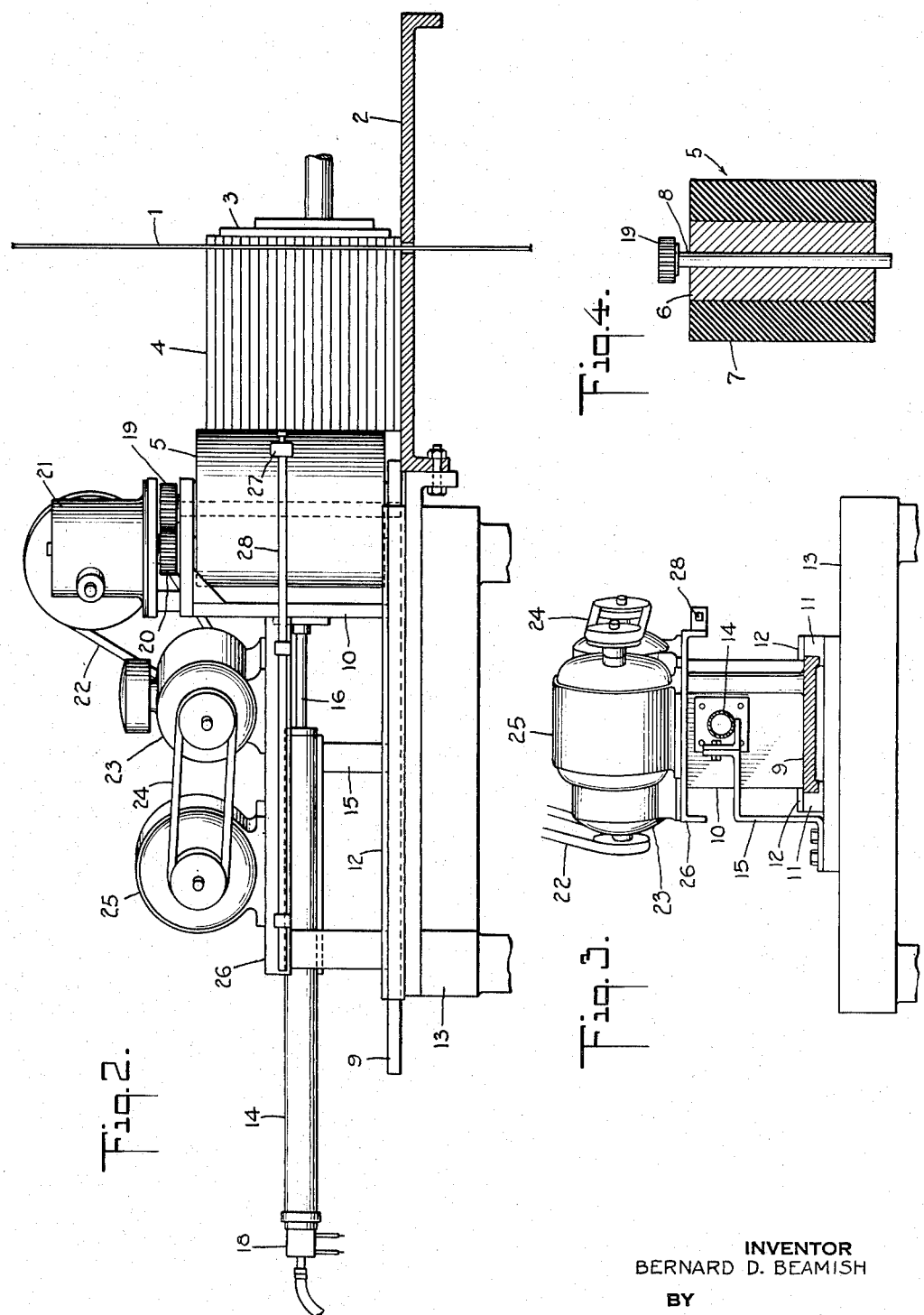

Patented Aug. 24, 1954

2,687,150

UNITED STATES PATENT OFFICE 2,687,150

APPARATUS FOR SLICING HONEYCOMB CORES

Bernard D. Beamish, Mount Vernon, N. Y., assignor to Honeycomb Company of America, Incorporated, Mount Vernon, N. Y., a corporation of New York Application July 2, 1951, Serial No. 234,879

3 Claims. (Cl. 143—4)

The present invention relates to improvements in apparatus for cutting blocks of material into slices and relates, more particularly, to apparatus for cutting blocks of cellular material such as honeycomb core into slices of a desired thickness in such a manner that face plates may be readily applied to the surfaces thereof.

The customary practice in cutting blocks of such material into slices is to have an operator force the block of material against a guide set at a fixed distance from a saw blade and at the same time feed the block forward into engagement with the saw blade. This has a number of disadvantages. First, it requires unusual strength and effort on the part of the operator for an industrial operation and is so fatiguing that two operators are required so that one can spell the other in order to maintain continuous production. Also, because of the physical effort required on the part of the operator in this operation, the sizes of the blocks of material which can be cut must be limited beyond what it would otherwise be economical to fabricate.

In addition, it is not possible for an operator to apply completely even pressure in holding the block against the guide while he is feeding the block to the saw blade at the same time with the result that tolerances on the ultimate slice cannot be set too close. Further, as the slices approach the end of the block so that the remaining portion, which protects the operator's hands becomes thin, it is dangerous and not practical to saw the last slice from the block and for this reason, it is also impractical to resaw slices that have been cut into thinner slices.

The present invention overcomes these difficulties and provides a machine which performs the work previously done by the operator in cutting blocks of cellular honeycomb core material into slices of a desired thickness for the attachment of face plates to the surfaces thereof. The present invention makes it possible to cut the material into slices which are uniform and which have faces that are parallel within extremely small tolerances thereby facilitating the attachment of face plates to the slices. In addition, the present invention makes it possible to cut the block through to the last slice or to cut slices already cut into thinner slices if desired.

Further objects and advantages of the present invention will be apparent and best understood from the following description and the accompanying drawings in which:

Fig. 2 is an end view of the machine illustrated in Fig. 1;

Fig. 3 is a section view taken along the line 3—3 of Fig. 1; and

Fig. 4 is a vertical section view of the driving roll employed in the machine illustrated in Fig. 1.

Figure 1:
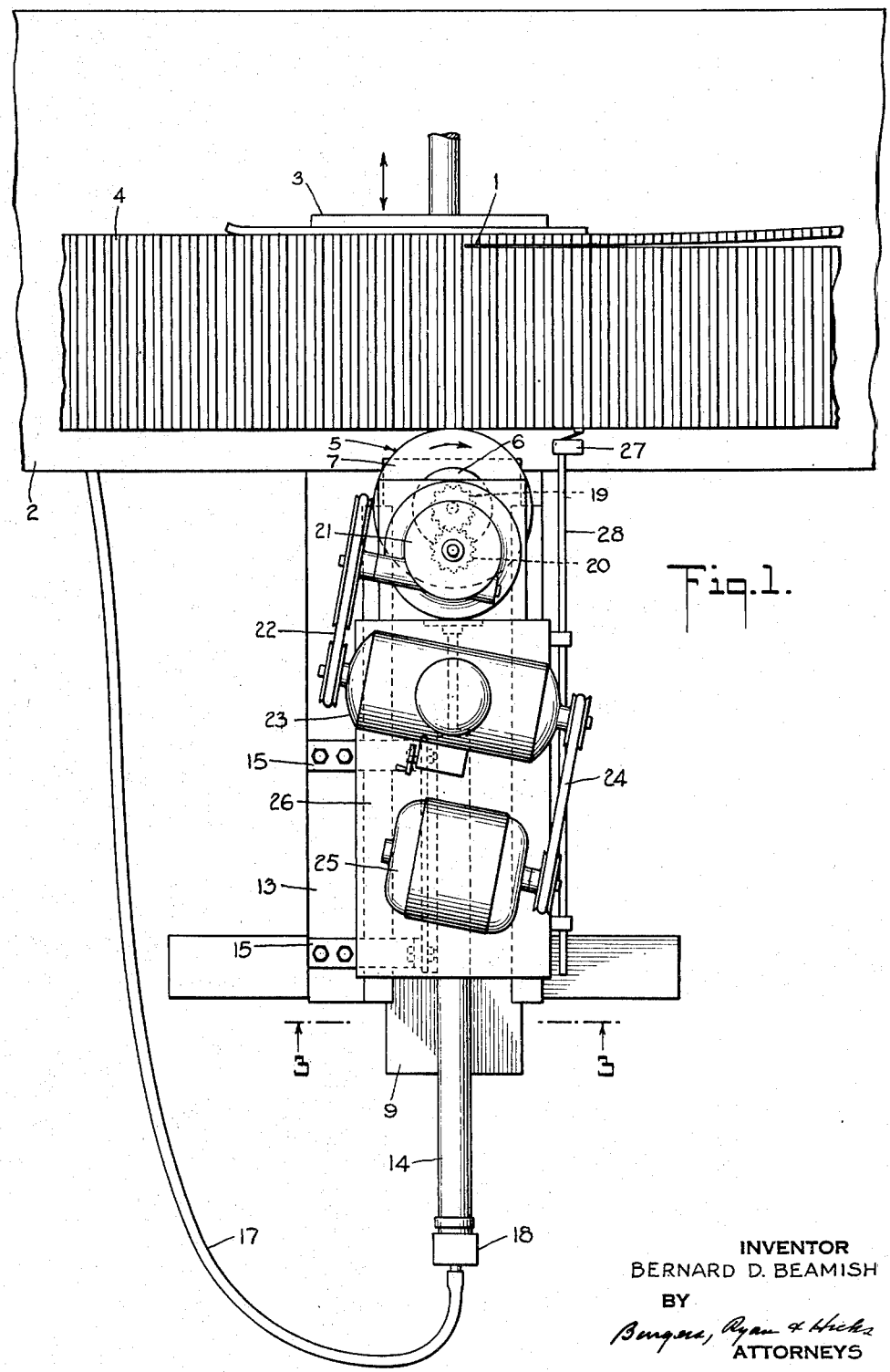
Fig. 1 is a plan view of a machine embodying the present invention.

Referring now to the drawings in detail, there is a band saw 1 which is operated by suitable driving mechanism (not shown) in the usual manner. The blade of the band saw 1 extends vertically through an opening in a saw blade 2 on which a guide 3 is adjustably positioned so that it may be set at the required distance from the blade of the band saw to cut slices of the thickness desired. In actual practice, it is customary to employ a woodcutting type band saw with a blade speed of approximately 900 feet per minute having a blade 1 inch wide, $\frac{1}{32}$ of an inch thick and 8 teeth to the inch. However, these portions of the machine are conventional and need not be described in detail here.

A block of cellular or honeycomb core material 4 that is to be cut into slices is supported on the table 2 with one side against the guide 3. The block of core material 4 may be made from aluminum, steel, cloth or other suitable materials and it is positioned on the table with the cellular openings therein extending at right angles to the saw. A rubber-covered roll 5 is rotatably supported in a vertical position opposing the guide 3 and engages with the other side of the block of core material 4 at a point just in advance of the cutting edge of the saw blade 1. As the roll 5 is rotated in a clockwise direction, it frictionally engages with the side of the block of core material and advances the block with a sliding movement along the guide 3 into engagement with the cutting edge of the saw blade 1.

As shown best in Fig. 4, the roll 5 consists of a steel core 6 which has a coating 7 of a material such as rubber that is resilient and tractive. The thickness of the rubber coating 7 is approximately equal to the radius of the steel core; i. e., for a four-inch core, there is a two-inch coating of rubber all around the core. The core 6 is secured to a shaft 8 which extends beyond the ends of the core. One end of the shaft 8 is journalled in a slide 9 and the other end of the shaft is journalled in an arm of a bracket 10 that is supported on the slide 9.

The slide 9 is slidably mounted on a pair of guide rails 11 and is held in place thereon by gibs 12. The rails 11 are supported on a table 13 that is attached to the side of the saw table 2 and forms an extension thereof. The rails 11 are positioned so that the slide 9 may extend over the saw table 3 in movement of the roll 5 toward and away from the guide 3 and into engagement with the block of core material 4. This permits the roll 5 to be moved into engagement with blocks of core material 4 of various thicknesses, and it also permits the roll 5 to be advanced by the slide to within a fraction of an inch of the saw blade 1. The roll 5 is moved back or retracted to permit a new block of core material to be introduced or to continue cutting on the same block of core material after slices have been cut therefrom.

The roll 5 may be moved in either direction by means of a double-acting air cylinder 14. The air cylinder 14 is supported in a fixed position on the table 13 by brackets 15 and contains a piston 16, the outer end of which is attached to the bracket 10 that is secured to the slide 9. The air cylinder is connected to a supply of air under pressure through a flexible tube 17 and has an electrically operated valve 18 which controls the direction in which the piston 16 is moved when air under pressure is supplied to the cylinder. Thus, when air pressure is supplied to the cylinder to operate the piston 16 in one direction, the slide 9 is moved toward the saw blade 1 and the roll 5 supported thereon is moved into engagement with the side of the block of core material 4. During the cutting operation, the roll 5 is held in engagement with the block of core material under pressure from the cylinder 14. Operation of the piston 16 in the opposite direction by the air cylinder retracts the roll 5.

The roll 5 is driven through a gear 19 secured to an end of the shaft 8 which projects above the arm of the bracket 10. The gear 19 engages with a gear 20 that is driven by a speed-reducing unit 21. The speed-reducing unit may be a worm-driven type having a speed reduction ratio of about 36 to 1. The speed-reducing unit 21 is driven through a belt and pulley arrangement 22 by a variable-speed drive unit 23 that is, in turn, driven through a belt and pulley arrangement 24 by an electric motor 25. The variable-speed drive unit 23 may be of a hydraulic type and permits the speed at which the roll 5 is driven to be varied so that the rate at which the block of core material 4 being sliced is fed into the saw blade 1 can be varied to suit the rate at which the saw blade 1 cuts the particular material of which the block is made.

The speed-reducing unit 21 is supported on the bracket 10 above the rear of the roll 5 and the hydraulic variable-speed drive 23 and the electric motor 25 are mounted on a plate 26 that is supported from the slide 9. Thus, the entire driving mechanism for the roll 5 moves with the roll and the slide 9 when they are moved in either direction by the operation of the air cylinder.

An automatic control means reverses the action of the air cylinder when a slice is cast from the block of core material and the end of the block leaves the roll 4. The control means consists of a microswitch 27 located at one side of the roll 5 and to the rear of the saw blade 1. The switch 27 is supported on a rod 28 that is adjustably supported on the plate 26 carried by the slide 9. The microswitch 27 is positioned so that it is about even with the front of the roll 5 on the advancing side thereof i. e., on the side of the roll toward the saw blade. When the end of the block leaves the roll 5, the slide assembly is moved toward the guide 3 by the piston 16 which immediately moves the microswitch 27 into contact with the side of the block. This occurs just as the cut has been completed and the microswitch 27 is connected so that when it is closed in this manner, it will operate the valve 18 of the air cylinder 14 to reverse the direction in which the piston 16 is moved and thus, retract the slide assembly for the commencement of another slicing operation.

In operation of the machine, the slide assembly is first retracted and then the block of core material 4 is projected between the roll 5 and the guide 3 to a point where the leading end of the block almost contacts the saw blade 1. The air cylinder is then actuated to push the slide assembly forward carrying the roll 5 into engagement with the side of the block 4. This presses the block against the guide 3 under the full pressure applied by the air cylinder 14. The electric motor 25 is then started and the roll 5 is driven at a predetermined speed. This drives the block 4 forward with a sliding movement relative to the guide 3 and toward the cutting edge of the saw blade 1.

When the cut has been completed and the slide assembly has been retracted through operation of the microswitch 27, the block of core material is manually pushed back to the input side of the saw blade 1 to cut another slice and the slice that has been cut will fall over onto a suitable conveyor at one side of the machine.

It will be understood that various changes and modifications may be made by those skilled in the art in the particular embodiment of the invention illustrated and described herein without departing from the scope of the following claims.

I claim:

1. In an apparatus for cutting a slice from a block of material wherein the block of material is advanced with a sliding movement along a guide into cutting engagement with a saw blade, the combination of a movable support, said support having a forward end opposing the guide and being movable toward and away from the guide, a driving roll rotatably mounted on the support for frictionally engaging with one side of a block of material in opposing relation to the guide, means carried on said support for driving said roll and advancing the block of material toward a saw blade, means for moving the support toward and away from the guide, said means including a double-acting cylinder connected to a source of fluid under pressure, a piston in said cylinder and a valve for controlling the admission of fluid under pressure to opposite ends of the cylinder, said cylinder being supported in a fixed position, said piston being connected to the movable support and normally urging the support toward the guide, means for automatically operating the valve to reverse the movement of the movable support, said control means including a valve-operating member carried on the movable support, said member being connected to the valve and being positioned to engage with one side of the block of material when the block of material advances beyond the driving roll and the movable support is moved toward the guide.

2. In an apparatus for cutting slices from blocks of material wherein the block of material is advanced with a sliding movement along a guide into cutting engagement with a saw blade, the combination of a movable support, said support having a forward end opposing the guide and being movable toward and away from the guide, a driving roll rotatably mounted at the forward end of said support for frictionally engaging with one side of a block of material in opposing relation to the guide, means mounted on said movable support for driving said roll, said means including an electric motor, a variable-speed unit connected to and driven by the motor and a speed-reducing unit connected to and driven by the variable-speed unit, said speed-reducing unit having driving connections to the roll, means for moving the support toward and away from the guide, said means including a cylinder supported in a fixed position, a piston in said cylinder and connected to the support and an electrically operable valve connected to the cylinder for controlling the admission of fluid under pressure to said cylinder and the movement of the support toward and away from the guide and means for automatically operating said valve to move the support away from the guide, said means including a switch carried on the support and connected in circuit with the electrically operable valve for controlling the operation thereof, said switch normally being open and being positioned to engage with the side of the block of material upon movement of the support toward the guide when the block of material is advanced beyond the driving roll and being operable upon engagement with the block of material to reverse the movement of the support.

3. In an apparatus for sawing a slice from a block of material wherein the block of material is advanced into cutting engagement with a saw by a driving roll engaging with one side thereof in opposing relation to a relatively fixed guide and the driving roll is movable into and out of engagement with one side of the block of material by a double-acting cylinder and piston normally urging the driving roll toward the guide, said cylinder being connected to a source of fluid under pressure through a valve, said valve controlling the operation of the cylinder and piston in opposite directions, the improvement which comprises a valve-operating member connected to the valve and being movable with the driving roll, said valve-operating member being positioned to engage with one side of the block of material upon movement of the roll toward the guide when the block of material is advanced beyond the roll, said engagement of the valve-operating member with the block of material operating the valve to move the piston and the roll away from the guide.

References Cited in the file of this patent

UNITED STATES PATENTS

| Number | Name | Date |
|---|---|---|
| 269,118 | Rodenboh | Dec. 12, 1882 |
| 812,987 | Garland | Feb. 20, 1906 |
| 986,782 | Trogdon | Mar. 14, 1911 |
| 1,688,789 | Comiskey | Oct. 23, 1928 |
| 1,385,369 | Ferrier | July 26, 1931 |
| 2,332,888 | Bostwick et al. | Oct. 26, 1943 |
| 2,365,987 | Zimmerman | Dec. 26, 1944 |
| 2,584,837 | Bookhultz et al. | Feb. 5, 1952 |

FOREIGN PATENTS

| Number | Country | Date |
|---|---|---|
| 595,959 | France | July 27, 1925 |